United States Patent [19]
Kallenbach

[11] 3,778,087
[45] Dec. 11, 1973

[54] MOTORCYCLE TOWING APPARATUS

[76] Inventor: Ralph M. Kallenbach, 915 Carol Ave., Elgin, Ill. 60120

[22] Filed: Aug. 3, 1972

[21] Appl. No.: 277,666

[52] U.S. Cl.................. 280/292, 280/492, 280/402
[51] Int. Cl............................................ B62d 53/04
[58] Field of Search............................ 280/402, 292

[56] References Cited
UNITED STATES PATENTS

| | | | |
|---|---|---|---|
| 2,789,832 | 4/1957 | Zumwalt | 280/292 R |
| 3,430,983 | 3/1969 | Jones | 280/402 R |
| 2,988,382 | 6/1961 | Holland | 280/402 X |

*Primary Examiner*—Leo Friaglia
*Assistant Examiner*—Randall A. Schrecengost
*Attorney*—Howard H. Darbo et al.

[57] ABSTRACT

An elevated support extends under the front wheel of the motorcycle. The rear end of the support is rigidly attached to the foot pegs on the motorcycle. The front of the support is connected to the rear bumper of an automobile by a universal joint.

4 Claims, 4 Drawing Figures

PATENTED DEC 11 1973 3,778,087

MOTORCYCLE TOWING APPARATUS

SUMMARY OF THE INVENTION

The present invention is a simple towing device for a motorcycle or the like which adds little weight to the back of the towing vehicle.

DESCRIPTION OF SPECIFIC EMBODIMENT

Figure 1:
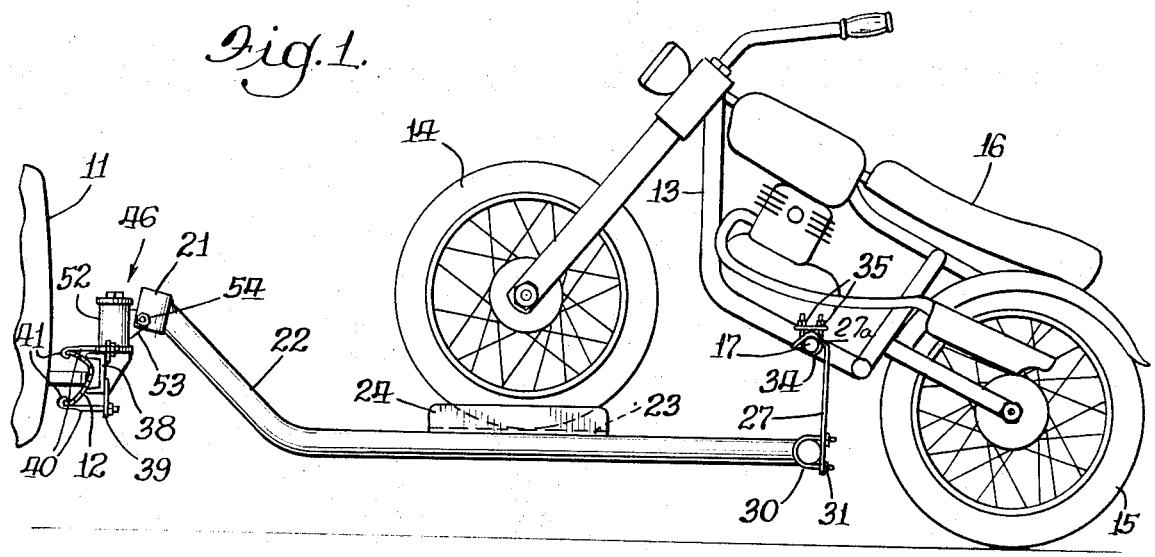
FIG. 1 is an elevation of an embodiment of the invention as employed in towing a motorcycle by a vehicle.
Figure 2:
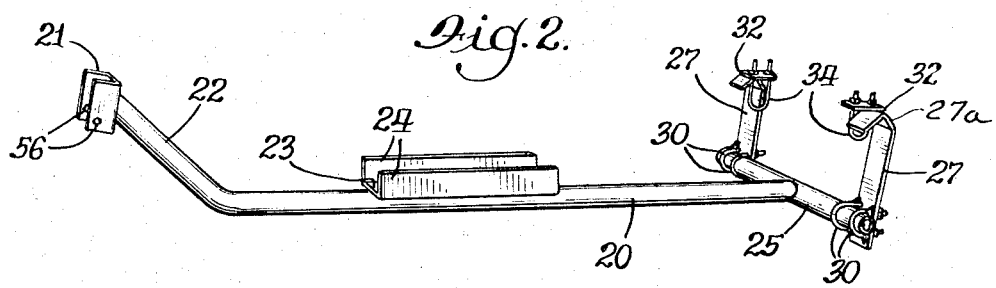
FIG. 2 is a perspective view of the main support.
Figures 3, 4:
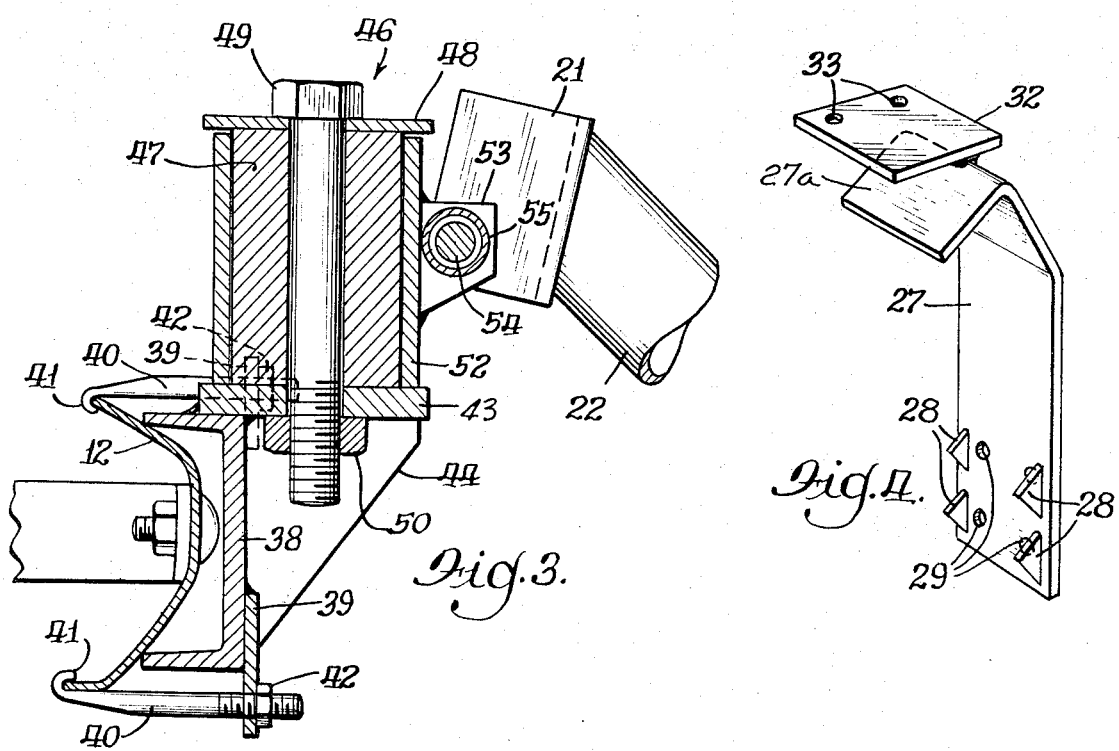
FIG. 3 is a sectional view illustrating the construction of the universal joint.
FIG. 4 is a perspective view of one of the brackets which attach to the motorcycle foot pegs.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The invention is employed for towing a motorcycle, generally 10, behind a vehicle, generally 11, such as an automobile. In the illustrated embodiment the vehicle has a rear bumper 12 to which the attachment is made. However, other forms of attachment, such as those employed for pulling trailers, can be used. The motorcycle 10 has a frame 13, a dirigible front wheel 14, a rear wheel 15, a seat 16, and foot pegs 17. These foot pegs extend outwardly from the frame 13 at opposite sides thereof. Normally they are employed as foot rests for a person seated on the seat 16. The showing of a two-wheel motorcycle is for illustrative purposes only. It will be apparent to those skilled in the art that the invention can be employed with other forms of bikes.

The illustrated embodiment comprises a tubular support member or bar 20. At its forward end there is a clevis 21. Immediately to the rear of its forward end the support member has a downwardly sloping portion 22. The remaining portion 23 is generally horizontal in use, although this will vary depending upon the configuration of the motorcycle, the height of the vehicle hitch, etc. The frame includes a platform 23 to receive the front wheel 14 and having sides 24. At the rear end of the support member it includes a crossbar 25.

Between the distal ends of the crossbars and the distal ends of the foot pegs 17 are rigid connecting means to hold the motorcycle in the position illustrated with respect to the support member. This connecting means comprises a pair of inverted J shaped brackets 27. upper ends of the inverted J brackets form hooks 27a which hang over the tops of the foot pegs 17. The lower end of the brackets have four triangular protrusions 28 against which the crossbar seats. There are also openings 29 to receive U-bolts 30. By tightening the nuts 31 on the U-bolts the brackets are securely affixed to the crossbar 25. When the nuts are loose, the brackets can be rotated about the axis of the crossbar so as to achieve an angular position necessary to fit a particular bike. At the upper end of each bracket 27 is a holding means to grasp the foot peg 17 and includes a plate 32 having openings 33 therein and a U-bolt inserted through openings 33. With the U-bolt slipped over a foot peg 17, the nuts 35 are tightened up to securely affix the upper end of the bracket to the foot peg. This attachment is such that the frame 13 of the motorcycle is rigidly aligned in a vertical position above the support member.

A channel 38 bears against the rear bumper 12. The channel has wings 39 welded thereto. Bolts 40 extend through openings in these wings. The forwardly end of the bolts 40 have hooks 41 to grasp the top and bottom of the bumper respectively. By tightening nuts 42 on the bolts the channel 38 is securely held against the bumper 12. A mounting plate 13 is welded to the channel and held in a horizontal orientation with respect to the channel by an angular bracket 44 welded to the two. This hitch assembly could be replaced by a conventional trailer hitch mounting for a vehicle.

Between the hitch assembly and the support member 20 is a universal joint, generally 46. It includes an annular post 47 and an enlarged annular plate 48 at the top thereof. A mounting bolt 49 extends through the top plate 48, the post 47 and the mounting plate 43. The bolt has a nut 50 to hold the assembly together. An annular sleeve 52 extends about the post 47, with the two being rotatable with respect to each other about a vertical axis. The sleeve rests on the mounting plate 43. The sleeve has a pair of spaced ears 53 welded thereto. These ears have an opening to receive a bolt 54. A spacer 55 surrounds the bolt and extends between the ears so that the ears cannot be bent toward each other. The bolt 54 also extends through openings 56 in clevis 21 so as to hold the clevis onto the sleeve 52 while permitting pivotal movement about the generally horizontal axis defined by bolt 54.

With the motorcycle secured to the vehicle 11 in the manner illustrated in FIG. 1, it can be towed, even at fairly rapid speeds, along the highway without fear of an accident resulting from the towed arrangement. The arrangement can be backed up in the same manner as would be employed when towing any small trailer behind a vehicle. The units are relatively narrow and several can be hitched behind a single towing vehicle. The mounting and demounting of the hitch arrangement is simple and can be done quite rapidly.

An important feature of the present invention is the fact that a comparatively small vertical loading is applied to the towing vehicle. With some other forms of bike towing devices there is a rigid arm or pocket which extends outwardly from the rear of the towing vehicle. When the front wheel of the bike is inserted into this pocket or onto the arm, the weight is applied to the towing vehicle by means of a comparatively long lever arm. This tends to reduce the weight on the front wheels of the towing vehicle, a disadvantageous arrangement. With the present invention the lever arm by which the weight is imposed on the towing vehicle is no farther back than the axis of bolt 54, since this bolt forms a pivotal connection. This greatly reduces the length of the lever arm by which the load is imposed on the towing vehicle. As a matter of fact, by increasing the length of the support member 20, and moving the platform 23 correspondingly towards the rear end of the support member, the amount of weight on the towing vehicle can be reduced; that is, more of the bike weight is thus transferred from the bar to the rear wheel 15 of the bike.

While the illustrated embodiment is intended to make use of the existing foot pegs on a motorcycle, a similar arrangement can be employed with bikes which do not have foot pegs. In that event, the brackets 27 would have a configuration to attach to some other part of the bike frame in a manner such that the bike was held rigidly in a vertical plane above the support member.

I claim:

1. A towing apparatus for towing a motorcycle or the like behind a vehicle having means for engaging the rear of said vehicle, said motorcycle or the like having front wheel means, rear wheel means, a frame and foot pegs between the wheel means and extending to each side of the frame, said apparatus comprising:

an elevated support member adapted to be connected to said first mentioned means and extending rearwardly from said vehicle when so connected, said support member including a platform to receive one of said wheel means and hold it in an elevated position while the other wheel means is ground engaging rearwardly of the support member; and rigid connecting means secured to said support member at the rearwardly end thereof, and releasably connected to said frame, said connecting means holding said member and said frame vertically aligned and transferring the weight of the rearward portion of the support member to the frame to be carried by said other wheel means, said connecting means comprising rigid brackets between the support member and the respective foot pegs, said brackets each including a hook which hangs over the top of the respective foot peg, and means secured to the brackets for releasably engaging the foot pegs.

2. An apparatus as set forth in claim 1, wherein said support member comprises a bar, said bar sloping downwardly from the forward end thereof with the remainder of the bar being substantially horizontal, said platform being intermediate the ends of the bar and having sides thereon, said brackets being in the form of an inverted J to hook over the top of said foot pegs, said means secured to the brackets includes "U" bolts secured to the top of the brackets and hooked under the foot pegs to releasably secure the tops of the brackets to the foot pegs.

3. An apparatus as set forth in claim 1, wherein said support member has a crossbar at the rearwardly end thereof, said brackets being affixed to said crossbar adjacent the distal ends thereof.

4. An apparatus as set forth in claim 3, wherein said crossbar is cylindrical, said brackets having means releasably affixing them to the crossbar in a plurality of radial positions about the crossbar.

* * * * *

UNITED STATES PATENT OFFICE
CERTIFICATE OF CORRECTION

Patent No. 3,778,087       Dated December 11, 1973

Inventor(s) Ralph M. Kallenbach

It is certified that error appears in the above-identified patent and that said Letters Patent are hereby corrected as shown below:

Column 1, line 55, before "upper" should be inserted --The--.

Signed and sealed this 16th day of April 1974.

(SEAL)
Attest:

EDWARD M. FLETCHER, JR.　　　　　　C. MARSHALL DANN
Attesting Officer　　　　　　　　　Commissioner of Patents